T. J. HALSTEAD.
BURGLAR ALARM.
APPLICATION FILED AUG. 16, 1911.
1,040,312.
Patented Oct. 8, 1912.
2 SHEETS—SHEET 1.
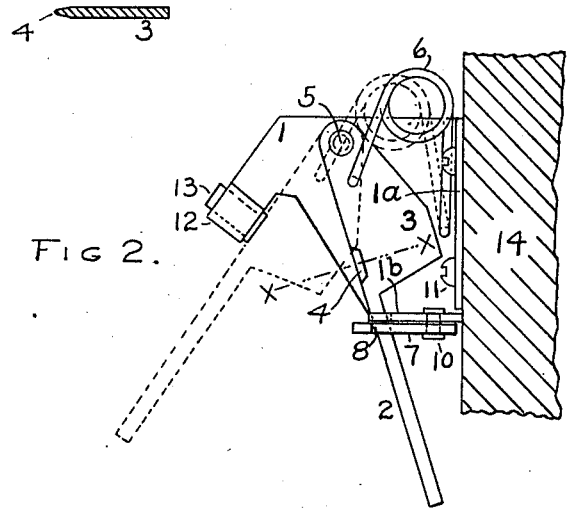

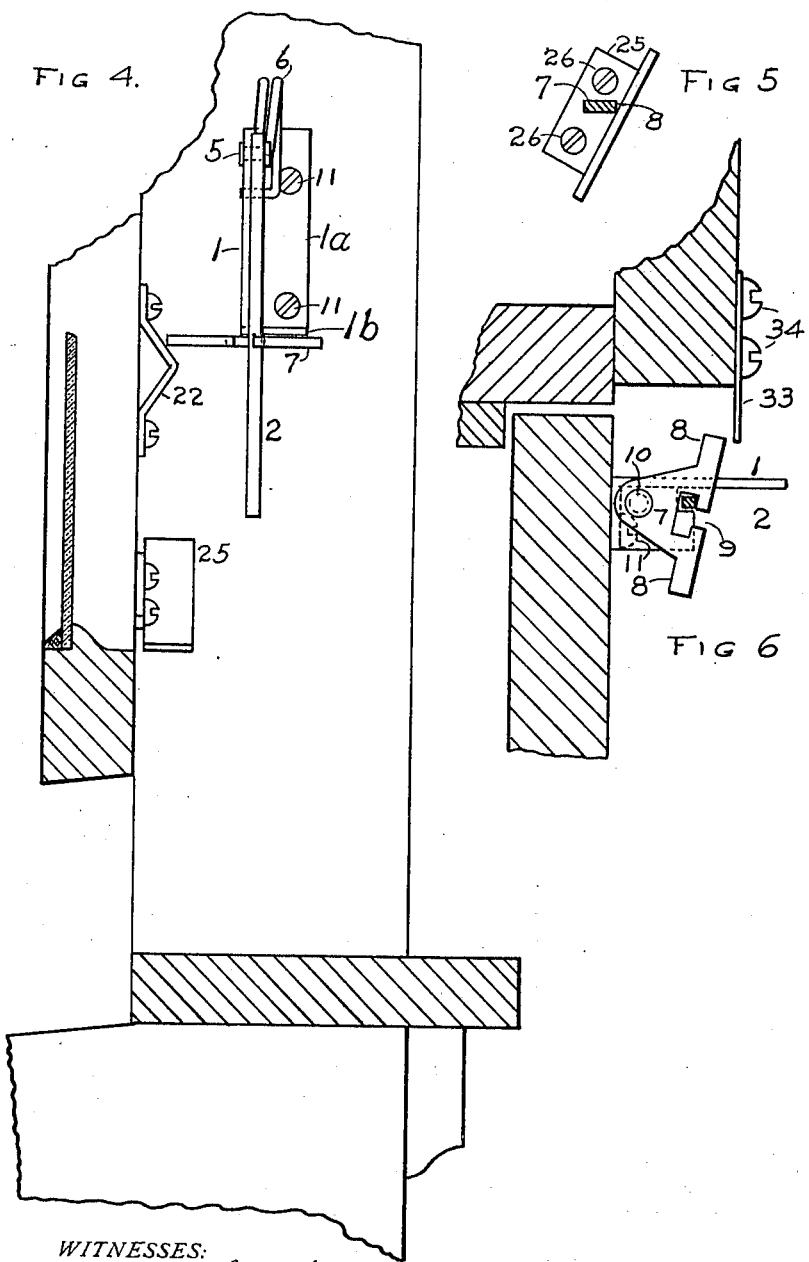

UNITED STATES PATENT OFFICE.

THOMAS J. HALSTEAD, OF DALLAS, TEXAS.

BURGLAR-ALARM.

1,040,312. Specification of Letters Patent. Patented Oct. 8, 1912.

Application filed August 16, 1911. Serial No. 644,472.

*To all whom it may concern:*

Be it known that I, THOMAS J. HALSTEAD, a citizen of the United States, residing at Dallas, in the county of Dallas and State of Texas, have invented certain new and useful Improvements in Burglar-Alarms, of which the following is a specification.

My invention relates to burglar alarms, and especially to that type of alarms in which the device is adapted to discharge a cartridge.

Still more especially is my invention designed as an improvement on the device shown and described in Letters Patent #701,753 to W. H. Moody, dated June 3, 1902, and is designed to make the device more attractive in appearance, more reliable in operation, to adapt it to a greater variety of uses, and to dispense with some of the parts employed in that device.

I attain these purposes by the means shown in the accompanying drawings, in which—

Figure 1 is an end view of my device, attached to a sliding door, such, for example, as a car door. Fig. 2 is an enlarged view to illustrate the construction and operation. Fig. 3 is a cross section of the striker on the line $x$—$x$ of Fig. 2. Figs. 4, 5 and 6 are details to illustrate various modifications and features of construction, and will be more fully explained hereafter.

Referring more particularly to the drawings, 1 is the main body of my device, which is stamped from a single sheet of metal, and is provided with two flanges, $1^a$ and $1^b$, the former adapted to be secured with screws 11 to the frame 14 of a window or door, as will be more fully described hereafter; the other, adapted to support the catch 7 or trigger, which is pivotally attached thereto by a pivot 10, or in any other suitable manner. The main body 1 is formed much broader than in the patent above referred to, not only to give increased strength, but to serve as a guide for the striker 3 which is also provided with a broad plate, as shown in Fig. 2, which serves to add weight, and also to guide the movement of the striker along the body 1. The striker 3 is pivotally attached at one of its extremities to the body 1 by a rivet or pivot 5, and is provided with a wedge shaped portion 4, shown in section in Fig. 3, at the point where it will strike the cartridge 13 so as to put into the head of the cartridge and make the firing surer. An integrally formed arm 2 extends outward from the main body 3 of the striker, and is adapted to enter the opening 9 in the catch 7 and engage with the projections at either side of that opening, by which means the catch operates a trigger to release the striker, and, there being projections adapted to engage the striker arm 2 on each side of the opening 9, the device becomes either right or left handed without change. The striker 3 is operated by a spring 6. In this respect my improved device differs from that shown in the patent above referred to in which the spring and striker were integrally formed. I find by this change in the construction, that I secure greatly increased efficiency of operation, and am enabled to dispose entirely with the hammer 18 of the patent referred to. The cartridge holding tube 12 is substantially the same in my device as in that shown in the patent referred to.

Where my device is employed on a sliding door, as shown in Fig. 1, a trip, substantially of the construction shown in the figure, is employed, which trip is composed of a main body 17 adapted to be attached to the door 15 by screws 16, or in any other suitable manner. To this main body, the trip 19 proper, is attached by a hinge-joint 20, so as to open to a position substantially at right angles to the door 15, and is retained in this position by a coil-spring 21. As the door is closed, the end 8 of the catch 7 will strike against the back side of the trip 19 and bend it over as shown by the dotted lines in Fig. 1. The catch 7 being then in the position shown in the figure, the pressure in closing the door will be on the front side of the catch, and it will not release the striker arm, but will, on the other hand, press it more tightly into position. As soon as the door is closed, however, the trip will spring back into position as shown by the solid lines in the figure, and will then rest behind the projection 8, and at any attempt to open the door the trip will engage with the trigger, releasing the striker and exploding the cartridge. Of course, a sufficient space must be left to permit the trip 19 to pass the projection 8 sufficiently so that it can spring back to its proper position when the door is completely closed. When used on an ordinary door, I prefer the construction of trip shown in Fig. 6, which is simply a straight spring 33 secured by screws 34 to the casing 31. As the door is closed, the projection 8 will strike the outer side of the spring, which will yield and permit it to pass; but on opening, it will engage with the back side and release the striker.

For use with windows, either form of trip 22 or 25 as shown in Fig. 4, (the latter being shown on an enlarged scale in Fig. 5,) may be employed. Where these forms are used, the device is set after the window is closed, and when raised, the trip acts on the catch 7, as shown in Figs. 4 and 5, to release the striker. It is evident that either trip 22 or 25 may be attached to the window sash 27 at any desired point so that, if desired, the window may be raised for the admission of fresh air, but not sufficiently to permit entrance without exploding the cartridge; but if any attempt is made to raise it higher, namely, above the point where the trip engages with the projection 8 on the catch 7, the striker will be released.

I claim as my invention, and desire to secure by Letters Patent:

In an alarm of the character described, a supporting member provided with means adapted to support a cartridge, a striker pivotally secured to said supporting member and provided with means adapted to engage a cartridge secured in the supporting member, said striker being provided with an arm extending downwardly therefrom, a horizontally disposed trigger pivotally secured to the lower portion of said supporting member and provided with a transverse opening therein adapted to receive the arm depending from the striker, said trigger being provided in the front edge thereof with a slot communicating with the opening therein intermediate the ends thereof, the side portions of said trigger being provided with laterally extending trip engaging portions.

In testimony whereof, I affix my signature in the presence of two witnesses.

THOMAS J. HALSTEAD.

Witnesses:
    EDWARD CAHILL,
    L. E. PUETT.

---

Copies of this patent may be obtained for five cents each, by addressing the "Commissioner of Patents, Washington, D. C."